Nov. 30, 1948.   F. F. VERSAW   2,455,285
STRAIN GAUGE
Filed Sept. 13, 1945   4 Sheets-Sheet 1

Inventor:
Forest F. Versaw,
By A. M. Houghton
his Attorney.

Nov. 30, 1948.  F. F. VERSAW  2,455,285
STRAIN GAUGE
Filed Sept. 13, 1945  4 Sheets-Sheet 2
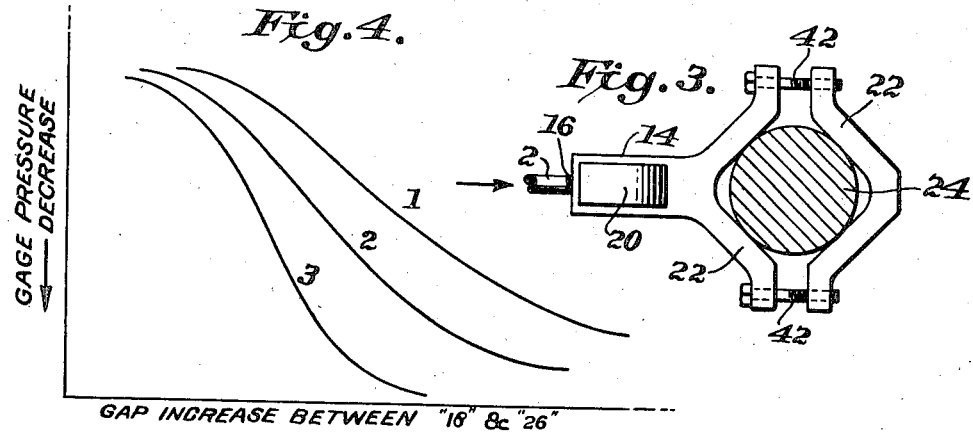
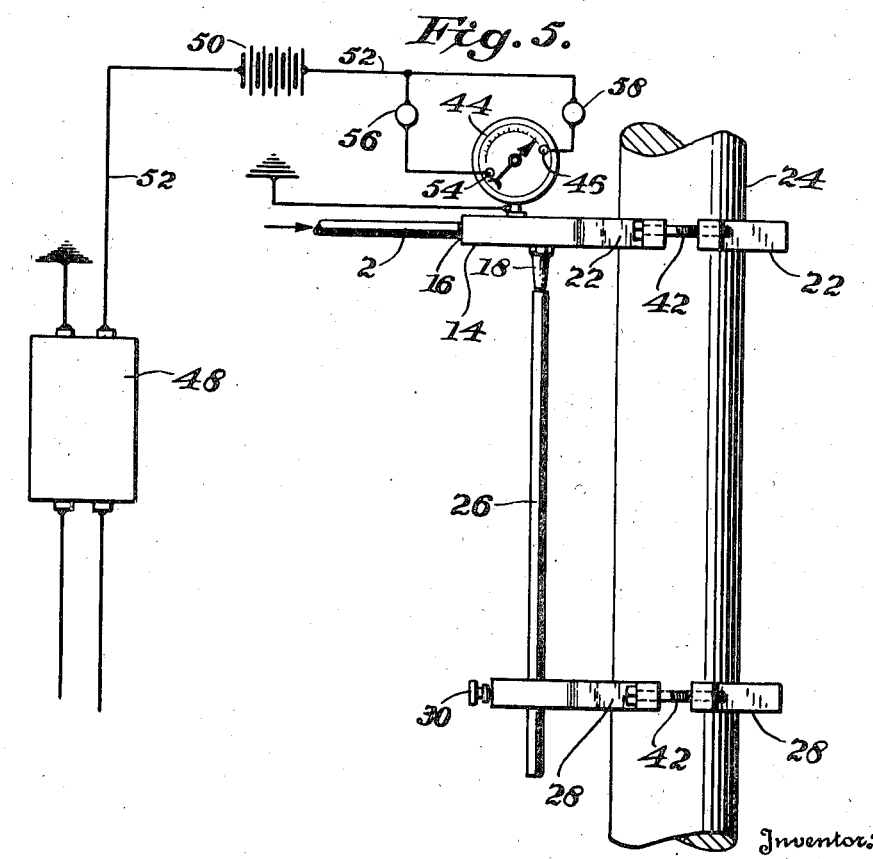
Inventor:
Forest F. Versaw,
By [signature]
Attorney.

Nov. 30, 1948.  F. F. VERSAW  2,455,285
STRAIN GAUGE
Filed Sept. 13, 1945  4 Sheets-Sheet 3
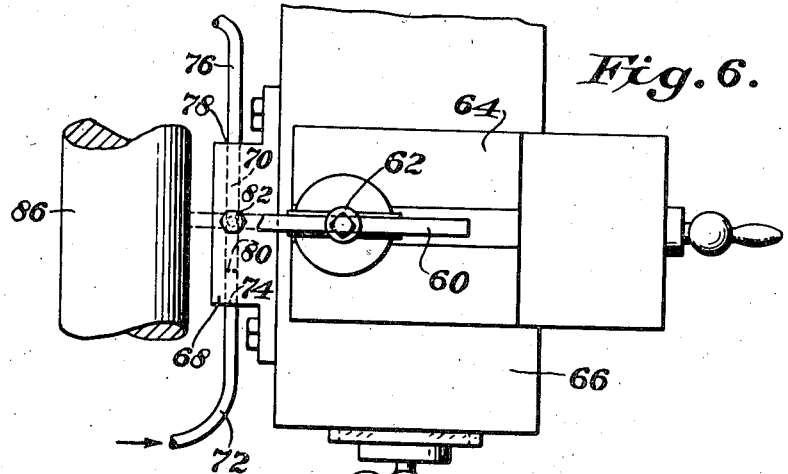
Fig. 6.
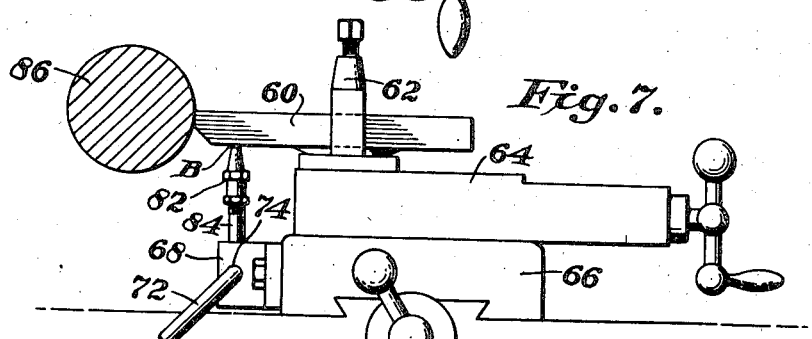
Fig. 7.
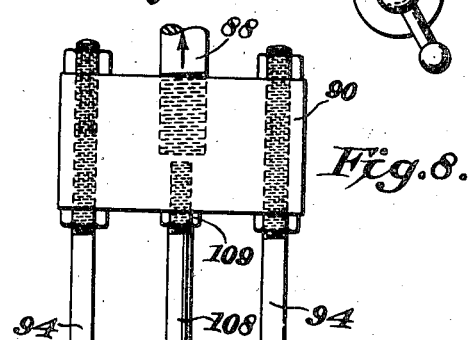
Fig. 8.
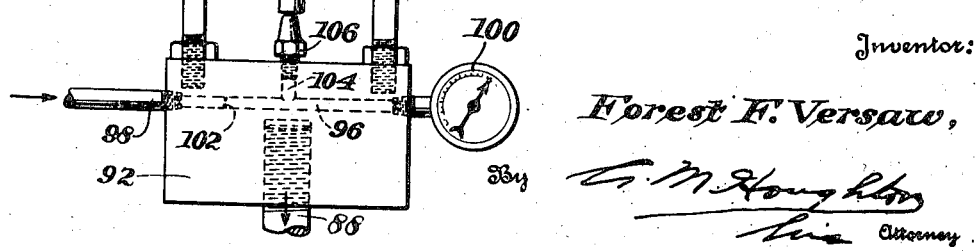
Inventor:
Forest F. Versaw,
By G. M. Houghton
Attorney.

Nov. 30, 1948.   F. F. VERSAW   2,455,285
STRAIN GAUGE
Filed Sept. 13, 1945   4 Sheets-Sheet 4
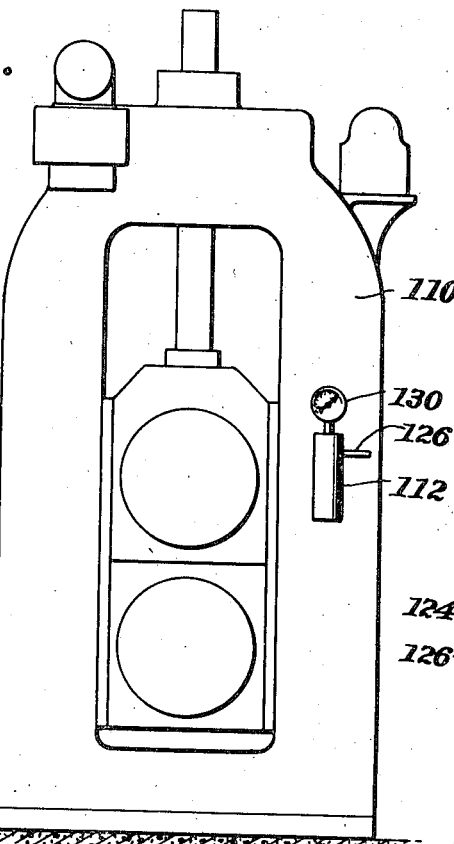
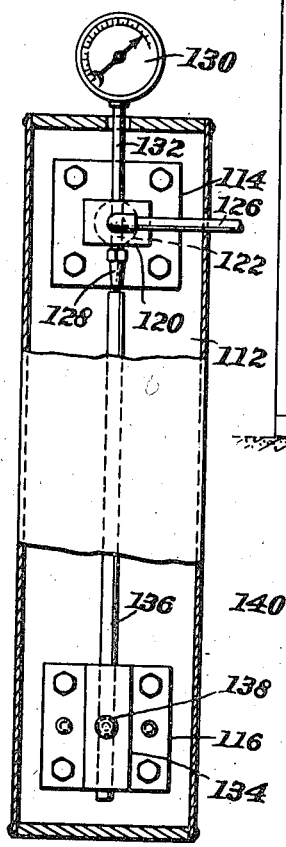
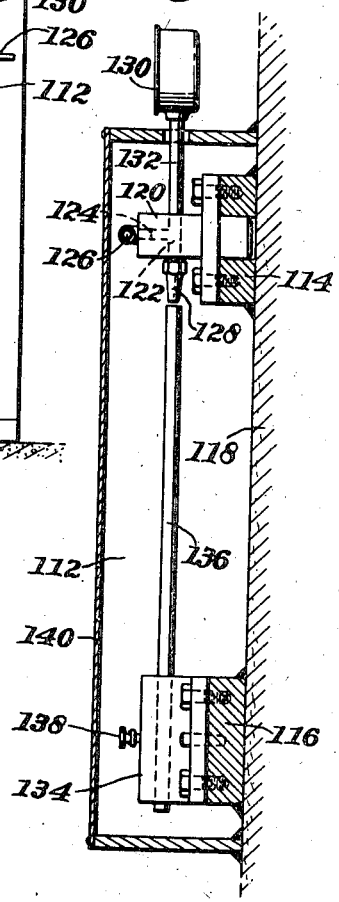
Inventor:
Forest F. Versaw,
By
Attorney.

Patented Nov. 30, 1948

2,455,285

UNITED STATES PATENT OFFICE 2,455,285

STRAIN GAUGE

Forest F. Versaw, Penn Township, Allegheny County, Pa., assignor to Gulf Research & Development Company, Pittsburgh, Pa., a corporation of Delaware Application September 13, 1945, Serial No. 616,065

3 Claims. (Cl. 73—88)

This invention relates to stress-strain measurement apparatus. More particularly, the invention is concerned with the determination and control of the stress being exerted upon and the strain existing in an extensible or compressible member and apparatus therefor.

A principal object of this invention is the provision of a new apparatus for measuring the stress applied to and the strain existing in rigid members as the result of applied stresses. Another object is the provision of apparatus for measuring the load upon a tool doing work on a work-piece. Other objects include the provision of an apparatus for evaluating the effectiveness of cutting oils, the provision of an apparatus for preventing rigid members which are subjected to high degrees of stress from becoming over-strained and the provision of a strain measuring apparatus which is extremely sensitive and yet very simple in operation. Further objects and the entire scope of applicability of this invention will become apparent from the detailed description given hereinafter.

These objects are accomplished according to the present invention by a novel assembly of apparatus for determining the fluid pressure existing between a pair of orifices in series with one another in a fluid conducting line through which fluid under substantially constant initial pressure is flowing, one of the orifices or openings being of a predetermined fixed size and the other orifice or opening being caused to vary continuously in size in accordance with the strain in the member, whereby variations in the fluid pressure are taken as a measure of the strain in the member.

A complete understanding of this invention may be had from the following detailed description by reference to the accompanying drawings in which:

Figure 3 is a top view partially in section of the orifice assembly and the manner in which it is rigidly mounted on the member under measurement of Figure 1.

Figure 4 is a graph of the relationship existing between the size of the variable orifice and the fluid pressure existing in the fluid conducting line between the variable and fixed orifice.

Figure 5 is a diagrammatic view of an apparatus of this invention for automatically controlling the stress in a strained member.

Figure 6 is a top view of the work tool section of a lathe provided with the measuring device of this invention.

Figure 7 is a side view of the lathe section of Figure 6.

Figure 8 is a side view of the application of the measuring device of this invention in a sucker rod string for well pumping.

Figure 9 is a side elevation of a section of a rolling mill provided with the measuring device of this invention.

Figure 10 is a front view, partly in section, showing in detail the measuring device shown in Figure 9.

Figure 11 is a side view, partly in section, showing in detail the measuring device shown in Figure 9.

Figure 1:
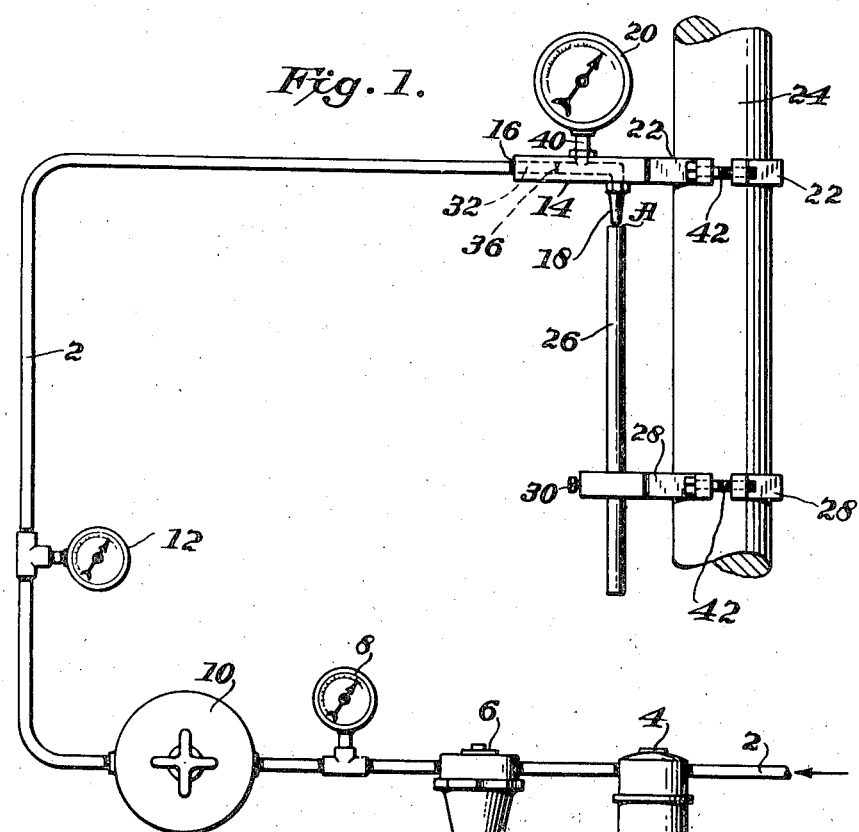
Figure 1 is a diagrammatic side view of one embodiment of this invention.

Referring to Figure 1 of the drawings, there is shown in an assembly for measuring the stress on a tie rod of a hydraulic press, a fluid conducting line 2 which is connected to means (not shown) for causing fluid to flow through the line 2 and the other members connected in series therewith, e. g., an air compressor or a vacuum pump. Inserted in the line 2 are an air filter 4, a reducing valve 6, a pressure gauge 8, a pressure regulator 10 and an operating pressure gauge 12.

The fluid conducting line 2 is connected to the orifice assembly 14 at the inlet 16. The orifice assembly 14 consists in part of a nozzle 18, gauge 20 and clamping means 22 for rigidly connecting the assembly to the rigid member 24, the tie rod of a hydraulic press.

A bar or rod 26 is rigidly connected by the clamp 28 to the strained member 24 thus forming an extended portion of the member. The bar 26 is positioned in axial alignment with the nozzle 18 and in close proximity thereto so that relative movement of the nozzle 18 and bar 26 upon application of stress to the member 24 will be parallel to the force vector of the applied stress. In other words, the bar 26 is connected to the member 24 so that it moves parallel to the direction of compression or extension of the member 24.

The clamp 28 for connecting the bar 26 to the member 24 is provided with an adjustment screw 30 which permits the bar 26 to be moved axially with the nozzle 18 and parallel to the member 24 so as to permit adjustment of the distance between the ends of the bar 26 and the nozzle 18.

Figure 2:
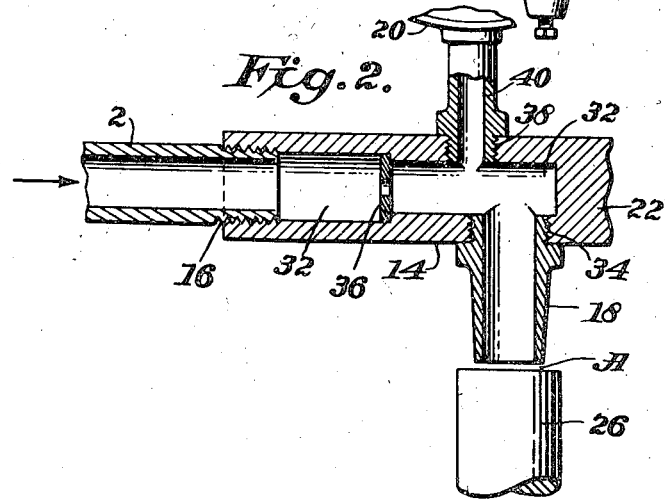
Figure 2 is a detailed side view partly in section of the orifice assembly of Figure 1.

Figure 2 shows the orifice assembly 14 of Figure 1 in detail. This assembly consists of a fluid conducting channel 32 with the end 16 connected to the fluid conducting line 2 and the opening 34 connected to the threaded end of the nozzle 18.

An orifice 36 of fixed size is situated in the channel 32 between the opening 34 and the end 16. Another opening 38 is provided in the channel 32 between the orifice 36 and the opening 34. This opening 38 permits the threaded end 40 of the gauge 20 to be inserted in fluid-tight connection with the channel 32.

Figure 3 shows in more detail the method of mounting of the orifice assembly 14 upon the member 24. It shows the fluid conducting line 2 connected to the orifice assembly 14 at the opening 16. An extension of the orifice assembly 14 forms half of the clamping means 22. The other half of the clamping means consisting of a bracket which is joined to the first half of the clamp by the bolts 42 which serve to securely fasten the clamp 22 to the member 24. Thus, the orifice assembly 14 and the gauge 20 may be secured to the member 24 so as to prevent any relative movement between these two elements. For proper operation both the nozzle 18 and the extended portion, i. e., bar 26, must be connected to the member 24 so as to be immovable relative to the member 24 during operation.

Referring again to Figure 1, the operation of the sensitive measurement instrument illustrated therein is as follows: compressed air from a compressor and surge tank is supplied to the fluid conducting line 2 and made to pass first through the air filter 4 and then through the reducing valve 6, wherein the pressure is reduced from the system pressure to about 30 p. s. i. From the reducing valve 6, the air flows through a pressure regulator 10 which serves to maintain the pressure of the air in the fluid conducting line which follows at a substantially constant value, and thence the air flows to the orifice assembly 14.

In the orifice assembly the air first passes into the portion of the channel 32 on the upstream side of the orifice 36. The flow of air is then restricted by the fixed orifice 36, passes through the remainder of the channel 32, through the opening 34, and finally exits into the surrounding atmosphere through the opening in the nozzle 18. However, in passing into the surrounding atmosphere through the nozzle 18 the flow of air is again restricted by the very narrow or capillary type opening A formed between the end of the nozzle 18 and the bar 26.

It will be seen that a certain pressure will exist within the channel 32 between the orifice 36 and the opening in the nozzle 18. With a constant air pressure of 30 p. s. i. supplied to the orifice assembly and with the bar 26 in contact with the nozzle face, the pressure in the chamber 32 between the orifice 36 and nozzle 18 will be equal to the pressure of the air being supplied to the system, i. e., 30 p. s. i. and will so register on the gauge 20. When the bar 26 is withdrawn slightly from the nozzle face, a flow of air will occur through the opening so formed. When the opening A becomes greater in effectual area than the orifice 36, a reduction in pressure will occur in the channel 32 between orifice 36 and the opening A and this reduced pressure will so register on the gauge 20. Hence, variances in the distance between the face of the nozzle 18 and the end of the bar 26 will be manifested by variations in the pressure existing between the orifice 36 and the gap or opening A and, in turn, the pressure registered upon the gauge.

The general relationship existing between the increase in the effectual area of the opening A and the registered gauge pressure is indicated in the curves 1, 2 and 3 of the graph of Figure 4.

It is desirable to obtain as nearly a straight line relationship as possible and to obtain a full scale gauge indication for the maximum reading to be encountered. The gauge may be made to function on the straight line portion of the desired curve, as for instance, number two, by adjustment of the size of the orifice 36, the diameter of the nozzle 18, the width of the face of the nozzle 18 and the initial gap A between the bar 26 and the nozzle 18. Adjustment of the flow of fluid through the apparatus may also be made. The relationships should be calculated in advance to provide operation on the desired portion of a curve. An example of the magnitude of the size of these variables is a 0.015 in. diameter orifice 36, a nozzle 18 opening of 0.060 in., and a nozzle 18 face width of 0.010 in. for use with air at 30 p. s. i. However, it must be realized that these value are illustrative only and that they should be varied to give maximum efficiency to the final instrument in accordance with the principles outlined above.

The operation of this apparatus has been described as using compressed air. However, any fluid may be used and the direction of flow is immaterial, e. g., the apparatus may be satisfactorily operated using a vacuum on line 2 rather than compressed air.

With air passing through the nozzle, as indicated above, a specific pressure will register on the gauge 20. With the bar 26 adjusted relative to the nozzle 18 so as to measure compression in the member 24, the pressure registered upon the gauge 20 will increase in proportion to the compressing stress applied to the member 24 and the strain resulting in the member. If it is desired to measure the extension resulting from a strain applied to member 24, the gap A between nozzle 18 and bar 26 is adjusted so that gauge 20 will register the maximum reading to be encountered before the application of any strain to the member 24. With the gap so adjusted, the reading on the gauge 20 will decrease proportionally to the strain applied to member 24 and the extension stress resulting therein.

It will be appreciated that the exact relationship existing between degree of strain in any particular member under measurement and the value registered upon the gauge will be dependent upon the nature of the member under measurement and upon the other variables such as orifice size, etc., discussed above. The particular relationship existing for any given assembly may be calculated according to well known principles, as those skilled in the art will be aware and, since this calculation forms no essential part of this invention, it has been omitted from this discussion.

Another application of an apparatus of this invention is illustrated by the diagrammatic drawing of Fig. 5. This drawing illustrates a device similar to that shown in Figure 1, but in this particular set-up the gauge 20 of Figure 1 is replaced by a gauge 44. This gauge is provided with an electric contact 46 so that when the reading upon the gauge reaches a predetermined, fixed, maximum value, the relay 48 of the ordinary type will be caused to operate by means of the current passing from the battery 50 through the wires 52. The relay 48 is connected to the electric motor or other means supplying the stressing force to the member 24 and, therefore, the stressing force will be automatically shut off when the gauge 44 goes beyond the predetermined maximum value.

The gauge 44 is supplied with another electrical contact 54 which permits a similar operation of the relay 46 and the discontinuance of the stressing force when the gauge 44 registers a predetermined minimum value. The wire 52 between the battery 50 and the gauge 44 is supplied with switches 56 and 58 which permit the assembly to be controlled either for maximum gauge or minimum gauge operation.

With the assembly illustrated in Figure 5 it is possible to prevent the strain resulting in the member 24 from exceeding a predetermined, fixed value. Because of the unusual sensitiveness of the measuring device of this invention, this application of the invention is particularly useful.

One of the most important applications of my apparatus for strain measurement is illustrated in Figures 6 and 7. Figure 6 is a top view partly in section and Figure 7 is a side view of the working tool section of a lathe in which my apparatus is incorporated. These figures show the work tool 60 mounted in well known fashion in the tool holder 62 which is mounted upon the transverse slide 64 and the longitudinal slide 66. A block 68 is bolted to the longitudinal slide 66. This block is drilled to provide a channel 70 therein.

An air pressure line 72 is connected at one end to the channel 70 at the opening 74 and at the other end to a source of air under a substantially constant pressure (not shown). Another air line 76 is connected at one end to the channel 70 at the opening 78 while the other end of the line 76 is connected to a pressure gauge (not shown). An orifice of fixed size 80 is inserted in the channel 70. A nozzle 82 is connected to the channel 70 by the nipple 84, the length of the nipple and nozzle being adjusted so that the end of the nozzle comes into close proximity with the working tool 60 and forms a small gap B between the tool 60 and the end of the nozzle 82.

In operation, the apparatus illustrated in Figures 6 and 7 will function as follows: air passes through the line 72, the orifice 80 and out through the nozzle 82. The gap B, the size of the orifice 80 and the pressure in the line 72 are arranged so that a minimum reading shows on the gauge attached to line 76 when the work tool 60 is out of contact with the work piece 86. With the work tool in contact with the work piece 86, the tool will be subjected to a stress which will cause the tool to be strained and cause the gap B between the tool 60 and the nozzle 82 to be decreased. As this gap is decreased, the pressure in the channel 70 between the nozzle 82 and the orifice 80 will increase and will so register upon the gauge attached to the line 76. As has been indicated above, the pressure changes showing on the gauge attached to line 76, will vary proportionally to the size of the gap B and, in turn, upon the strain existing in the work tool 60.

This application of my apparatus to measuring the strain existing in a work tool doing work upon a work piece such as the tool of a lathe, as indicated above, is particularly important. Because of the extreme sensitiveness of measurement, it is possible to determine to a very accurate degree the strain in the tool. Moreover, this measurement is continuous and even though the degree of accuracy of measurement is of a very high order, the apparatus is not subject to breakage as in the case of delicate measuring instruments.

This apparatus for measuring the strain in the work tool of a lathe is so accurate in its operation that it has been found to serve as an excellent means for determining the efficiency of cutting oils and to permit evaluation of the effect of various cutting oils with respect to the load on the work tool. Thus, with the tool 60 in contact with the work piece 86, a particular cutting oil is applied to the piece. The strain existing in the work tool resulting from operation of the tool upon the work piece coated with the cutting oil under test, will then register upon the gauge. A second oil is then applied to the work piece 86 and the strain, existing in the work tool 60 when operating upon the work piece coated with the second oil, will register on the gauge attached to the line 76. In this fashion, the load on the work tool for any series of cutting oils may be accurately determined and the relative efficiency of the cutting oils evaluated.

Another important application of this invention is illustrated in Figure 8. This shows a well pumping sucker rod string 88 provided with an embodiment of this invention for determining the strain existing in the rod string. The rod 88 is in two sections, one of the sections being threaded to a block 90 and the other section being threaded to a block 92. These two blocks 90 and 92 are rigidly held apart from one another at a predetermined, fixed distance by means of the bolts 94. The block 92 is provided with a channel 96 to which is attached at one end an air line 98 and at the other end a pressure gauge 100. The free end of the air line 98 is connected to a source of compressed air under substantially constant pressure. An orifice 102 of fixed size is inserted in the channel 96. Channel 96 is also provided on the down stream side of the orifice 102 with an opening 104 into which is threaded a nozzle 106.

A bar 108 is threaded into the block 90. This bar 108 is placed axially with the nozzle 106 both of which are parallel to the rod string 88, and the length of the bar and the position thereof are such that the end of the bar comes into close proximity with the opening in the nozzle, so as to form a small gap between the end of the bar and the nozzle face. The proximity of bar 108 to nozzle 106 may be adjusted by means of its screwthreaded connection with block 90, and it may be secured in adjusted position by the nut 109.

In operation, the strain dynamometer illustrated in Figure 8, functions on the same principle as the apparatus shown and described for Figures 1, 5, 6 and 7. Thus, air is supplied by the line 98 under constant pressure to the orifice assembly situated in the block 92. The air flows through the orifice 102 and then out of the nozzle 106 into the surrounding atmosphere by way of the small gap formed between the nozzle opening 106 and the bar 108. Variations in the opening of the gap which are proportional to the strain existing in the sucker rod string 88, will register upon the gauge 100. By means of proper calculation or through the use of a graph based upon suitable calculations, the stress being exerted upon the rod 88 and, in turn, the stress existing therein may be determined through the pressure differentials registered on the gauge.

Another application for which my invention is especially well adapted is illustrated in Figures 9 to 11. Figure 9 shows the housing 110 of a sheet metal rolling mill provided with a strain measuring device 112.

The strain measuring device 112 shown in Figure 9 is illustrated in more detail in Figures 10 and 11. The device comprises blocks 114 and 116 which are welded to the side 118 of the rolling mill housing. An orifice assembly 120 is bolted to the top block 114. This orifice assembly comprises a gas-tight chamber 122 in which is located an orifice 124 of fixed size. An air line 126 and a nozzle 128 are threaded into the chamber 122. A pressure gauge 130 is also connected to the orifice assembly by means of a pipe nipple 132.

A rod clamp 134 is bolted to the lower block 116. A rod 136 passes through this rod clamp 134 and is held at a controlled height by means of the thumb screw 138. The entire device with the exception of the pressure gauge 130 is enclosed in the housing or guard 140. In operation, the strain determination device illustrated in Figures 9 to 11 functions on the same principle as the apparatus shown and described in Figures 1 and 5 to 7. Thus, air under a constant external pressure is supplied by the line 126 to the orifice assembly 120. The air flows first through the fixed orifice 124 and then out of the nozzle 128 into the surrounding atmosphere by way of the small gap which is formed between the nozzle 128 and the end of the rod 136. The size of this gap may be controlled by adjusting the height of the rod 136 through the use of the thumb screw 138. During operation, with the rod 136 placed at a controlled distance from the nozzle 128, variations in the strain existing in the rolling mill housing 110 will cause proportional variations in the opening of the gap between the nozzle and the rod. These variations in opening of the gap will be registered upon the gauge 130. By means of proper calculation or the use of a suitable graph, the strain existing in the assembly 110 may be readily determined through the pressure differentials registered on the gauge.

I claim:

1. In combination, a press tie rod, a bar of shorter length than said tie rod rigidly connected in parallel to said tie rod, a nozzle of a fluid conducting line rigidly connected to said tie rod so that the opening in said nozzle is closely spaced from an end of said bar, the bar and nozzle being in axial alignment, an orifice in said conducting line separate from said nozzle, means connected to said orifice for causing a flow of fluid through said conducting line at a substantially constant external pressure, and means for determining pressure differentials existing in said fluid conducting line between said nozzle and said orifice.

2. A strain gauge for measuring stress or load in a member resulting in a change of its dimension, comprising spaced supporting fixtures rigidly secured to a member in which the strain is to be measured, a rod carried at one end by one of said fixtures, said rod being spaced from said member and extending substantially parallel with the force vector of the stress applied to said member, a nozzle carried by said other fixture, directed toward the free end of said rod axially thereof and in close proximity thereto, a conduit connecting said nozzle with a source of fluid under pressure, a constricting member formed with an orifice of fixed size mounted in said conduit inwardly of the nozzle orifice, and a pressure responsive means communicating with a chamber in said conduit which is defined by the space between said orifices.

3. A strain gauge for indicating the load imposed upon mill rolls and roll neck bearings, comprising in combination with the mill housing of a rolling mill, a pair of bosses projecting outwardly therefrom, the space between said bosses spanning that portion of the housing in which strain is to be measured, clamping means carried by one of said bosses, a rod secured at one end by said clamping means for axial adjustment, said rod being spaced from the surface of said housing and extending substantially parallel therewith, a nozzle carried by the other said boss with its orifice directed toward the free end of said rod axially thereof and in such close proximity to the end of said rod as to partially obstruct flow of fluid through said nozzle, a conduit connecting said nozzle with a source of fluid under pressure, a constricting member formed with an orifice of fixed size mounted in said conduit inwardly of the nozzle orifice, and a pressure gauge communicating with a chamber in said conduit which is defined by the space between said orifices.

FOREST F. VERSAW.

REFERENCES CITED

The following references are of record in the file of this patent:

UNITED STATES PATENTS

| Number | Name | Date |
|---|---|---|
| 1,580,430 | Gaines | Apr. 13, 1926 |
| 1,985,576 | Mennesson | Dec. 25, 1934 |
| 2,013,810 | Shimek | Sept. 10, 1935 |
| 2,152,556 | Messinger | Mar. 28, 1939 |
| 2,212,085 | Tate | Aug. 20, 1926 |
| 2,268,783 | Tate | Jan. 6, 1942 |
| 2,304,402 | Faulkner | Dec. 8, 1942 |
| 2,325,345 | Tate | July 27, 1943 |

FOREIGN PATENTS

| Number | Country | Date |
|---|---|---|
| 202,691 | Great Britain | Aug. 27, 1923 |
| 521,011 | Germany | Mar. 16, 1931 |
| 812,000 | France | Jan. 27, 1937 |